July 21, 1931. B. A. DEISCH 1,815,837
CAN TESTING MACHINE
Filed Sept. 24, 1928 6 Sheets-Sheet 4

Patented July 21, 1931

1,815,837

UNITED STATES PATENT OFFICE

BERT A. DEISCH, OF CHICAGO, ILLINOIS, ASSIGNOR TO McDONALD MACHINE CO., OF CHICAGO, ILLINOIS, A CORPORATION OF ILLINOIS

CAN TESTING MACHINE

Application filed September 24, 1928. Serial No. 308,009.

This invention relates to can testing machines, and its principal object is to provide novel electrically controlled means for detecting leaky cans and separating them from the whole ones. Another object is to provide a can testing machine of which the selecting means is extremely sensitive, whereby a very slight leak in a can may be quickly detected and such can separated from the whole ones. Another object is to provide novel electrically operated selecting mechanism in a can testing machine in which the closing or breaking of the electric circuit for the electric mechanism is controlled by a change of pressure within or outside of the can which is being tested. Another object is to provide air chambers in connection with the can which is being tested, (one chamber being located on the outside and one on the inside of the can) and one chamber being of relatively large cubic capacity and the other of restricted capacity, and both separated from each other by the wall of the can, whereby when pressure is introduced to the relatively large chamber, or it is subjected to vacuum, the difference in pressure on the two sides of the can will rapidly tend to equalize in case of a leak in the can, and such change in the pressure in the restricted space will effect the operation of the can selecting mechanism.

With these and other objects and advantages in view, this invention consists in a can testing machine embodying a circuit closing means for the can selecting mechanism controlled by a change in pressure in a restricted space located on the outside or the inside of the can which is being tested. It further consists in a can testing machine in which a body of mercury is employed for making an electrical contact and thereby closing the circuit through the electric control element of the can selecting mechanism, and whereby the mercury is shifted slightly as a result of a change of pressure in the restricted space on the outside or inside of the can which is being tested.

It further consists in a machine as above set forth in which the can is hermetically sealed in a chamber of slightly greater diameter than the can, whereby a restricted air space is afforded between the can and the surrounding wall of the chamber, whereby the pressure in said restricted air space may be quickly increased or diminished in case of a leak in the wall of the can. It further consists in a can testing machine embodying a moving carrier for supporting a plurality of chambers in which the cans, as well as the chambers may be hermetically sealed, there being restricted air spaces between the cans and surrounding internal walls of the chambers, whereby when pressure is admitted to the cans, or they are subjected to vacuum, a change of the pressure in the surrounding restricted air spaces is quickly obtained in case there is a leak in the can. It further consists in a can testing machine as last above set forth, in which electrically controlled selecting mechanism is employed of which the circuits thereto are controlled by bodies of mercury acting, under the influence of changes of pressure in the restricted air spaces, to close the circuits to the electric selecting mechanism.

It further consists in a can testing machine having a carrier for supporting a number of can receiving chambers and mechanism for inserting the cans into said chambers and hermetically sealing said chambers and the cans contained therein, together with electrically controlled selecting mechanism, each embodying a body of mercury for making contact and thereby closing a circuit, the body of mercury being acted upon by pressure coming from a leaky can. It further consists in a can testing machine as above set forth having means operated by the selecting mechanism for discharging the leaky cans at a different place from the whole cans.

It further consists in the several novel features of construction, arrangement and combinations of parts hereinafter fully set forth.

The invention is clearly illustrated in the drawings accompanying this specification in which—

In order that the construction and operation of the machine illustrated in the drawings may be more readily understood, I shall proceed first to briefly describe its general construction, arrangement and operation.

A carrier, such as a turntable, is provided upon which are mounted a plurality of chambered can testers, in the chambers of which the cans are placed, and the cans and chambers hermetically sealed. Compressed air is admitted to the interior of each can and, in case there is a leak in a can, the compressed air will find its way into the restricted space in the chamber surrounding the can. Any slight rise in pressure in the restricted space is communicated to a body of confined mercury of a mercury switch which acts to close the circuit to the electric control element of the can selecting mechanism, and thereby to cause the leaky can to be discharged from the can tester at a predetermined place, whereas in the case of a whole can the pressure does not affect the mercury and, consequently, the electric control element of the can selecting mechanism is not actuated and the whole can is ejected at a different place, so that the whole cans will be delivered at a definite place and the leaky cans at another place. The mechanism which has been chosen to illustrate the invention will now be described.

Referring to the drawings accompanying this specification, which illustrate one embodiment of the invention, the reference character A designates a carrier, here shown in the form of a turntable, rotatably mounted upon a frame B, and driven by suitable mechanism, as will be hereinafter described. Mounted upon the turntable A are the can testers C which are circumferentially disposed upon the turntable and spaced equi-distant from each other. As many can testers may be employed as may be conveniently grouped around the circumference of the turntable.

At the receiving point of the machine is a a feed chute D (see Figs. 1 and 2) through which the cans are fed to the machine in position to be inserted into the air chamber of the can testers. At a discharge point of the machine is a discharge chute E (see Fig. 12) through which the leaky cans are discharged, and adjacent said discharge point is a discharge chute F through which the whole cans are discharged from the machine.

The turntable may be formed with a central hub 15 (see Fig. 1) and an annular table or platform 16 connected to the hub by radiating arms 17. The hub is rotatably supported upon a member 18 of the frame B, and upon the lower end of the hub is secured a worm gear wheel 19 which meshes with a worm pinion 20 (see Fig. 12) mounted upon a shaft 21 journaled in bearings carried by the frame of the machine and connected with any suitable source of power. It is here shown as provided with a belt pulley 22 upon its outer end which may be belted to any power driven belt pulley.

Secured to and extending up from the frame member 18 is a tubular post or spindle 23 which extends up through the hub 15 and forms a lateral bearing therefor. The tubular spindle also serves as a conduit for compressed air which may be contained in a storage tank or reservoir 24 connected to the tubular post or spindle 23 by a pipe 25. On the upper end of the hollow spindle is an air drum or head 26 which is rigidly connected to the hub of the turntable A, as, for instance, by a post 27 so as to rotate with the turntable. A stuffing box or other air tight connection is made between the air drum 26 and the hollow spindle 23 to prevent leakage at the joint between the two.

Inasmuch as the can testers C are similar in construction and operation, a description of one will suffice for them all. Referring now to Figs. 4 to 9, inclusive, a cylinder 28 is provided which contains an air chamber 29 into which the cans are inserted and sealed from the outer atmosphere. A bracket 30 is provided for supporting the cylinder and associated parts on the turntable A. One end of the cylinder 28 is open and the other end is closed by an end wall 31, and the open end is adapted to be closed by a can inserter having a cylinder sealing head, here shown as comprising a disk-like head portion 32 having on one face a rubber block 33 adapted to be brought into pressing engagement with the edge of the cylinder at its open end and also in pressing engagement with the edge of the open end of the can, shown at G.

The internal diameter of the cylindrical air chamber 29 is slightly greater than the external diameter of the cans to be tested, thereby forming (when a can has been inserted into the chamber) a restricted air space 34 between the external face of the can and the internal face of the cylinder. The sealing head of the can inserter is mounted upon a reciprocating rod 35 which extends parallel with the axis of the cylinder 28 and is slidably mounted in a bearing bracket 36 located adjacent the cylinder 28 and having a laterally extending flange 37 of the bracket 30 bolted or otherwise secured to the end wall 31 of the cylinder 28.

As has been explained, the rubber block 33 presses against the edges of the cylinder and can, thereby hermetically sealing both the can and the restricted air space around the same, and in the operation of the machine, compressed air is admitted to the interior of the can after it has been hermetically sealed within the cylinder 28. Conveniently the rod 35 may be made hollow and closed at both ends, and the end to which the sealing head of the can inserter is secured may communicate with the interior of the can through a conduit 38 which may be formed in the arm 39 which connects the disk-like portion 32 with the hollow rod 35. The conduit 38 leads through the rubber block 33 and discharges compressed air into the interior of the can, as is clearly illustrated in Fig. 9.

Upon the other end of the hollow rod 35 is secured a cap 40, which closes that end of the hollow rod and also serves as a shoulder on the rod 35, and from said cap leads an air conduit composed in part of flexible tubes 41 and 42, the latter of which leads to and is connected with the air drum 26. This arrangement provides one means whereby compressed air may be supplied to the interior of the cans when hermetically sealed in the cylinders of the can testers.

Associated with the can inserter is a can ejector 57 which comprises a head 58 contained in the chamber of the cylinder 28 and a stem 59 extending out through the end wall of the cylinder and secured to a block 60 which is mounted on the hollow rod 35 of the can inserter and is moved by said rod during the time that the can inserting head is being retracted from the cylinder 28. If desired, a stuffing box 61 may be provided around the stem 59 of the can ejector, so as to guard against any leakage of compressed air from the air chamber around the stem 59.

In the form of the invention illustrated, the block 60 is slidably mounted on the hollow rod 35 and is engaged by the shoulder formed by the cap 40 on the end of the rod 35, when said rod is moved in the direction to retract the can inserter. A slight clearance is left between the cap 40 and the block 60 which permits the hollow rod 35 and can inserter to move a slight distance before the cap 40 engages the block 60 and moves the can ejector. This arragement causes the rubber block 33 of the can inserter to separate slightly from the head 58 of the can ejector, so that when the can inserter and can ejector have been moved to the retracted position of the can inserter, the can is free to fall away from the can inserter and can ejector, and ample space is provided whereby another can may subsequently be placed therebetween.

The block 60 and therewith the can ejector are frictionally held upon a stationary rod 62 by a friction disk 63 (see Fig. 8) contained in the block 60, and held in frictional engagement with the rod 62 by a set screw 64. The purpose of the frictional connection between the block 60 and the can ejector is to permit of a limited amount of lost motion between the can inserter and can ejector in order to release the can held between them, and also to prevent the can ejector from being moved back in case no can is received in the air chamber. On the rod 62 is adjustably secured a collar 65 which forms a stop against which the block 60 strikes to thereby limit the backward movement of the can ejector, when forced back by the can inserter and an interposed can, and to provide for the clearance space between the block 60 and the shoulder formed by the cap 40.

Mechanism is provided for reciprocating the can inserters to thereby insert cans into the cylinders at the receiving point of the machine and to permit them to be ejected from the cylinders at the discharge points of the machine. The mechanism for actuating the can inserters will now be described.

Connected to the hollow rod 35 is one end of a link 43, the other end of which is connected to an arm 44 which is secured to a pinion 45 mounted on a rock shaft 46 which is rotatably mounted in a bearing formed upon the bracket 30. Meshing with the pinion 45 is a gear wheel 47 which is rigidly mounted upon a hollow shaft 48 journaled in a bearing 49 formed upon the bracket 30. Upon the lower end of the hollow shaft 48 is secured a can inserting and ejecting lever 50 which is arranged to engage with certain cams (hereafter described) during the movement of the turntable, whereby the link 43 is reciprocated through the instrumentality of the rock shaft 48, gear wheel 47, pinion 45 and crank arm 44, and the hollow rod 35 of the can inserter is thereby reciprocated at the proper times to insert the cans and permit them to be ejected from the cylinders.

Figures 12, 13, 14:
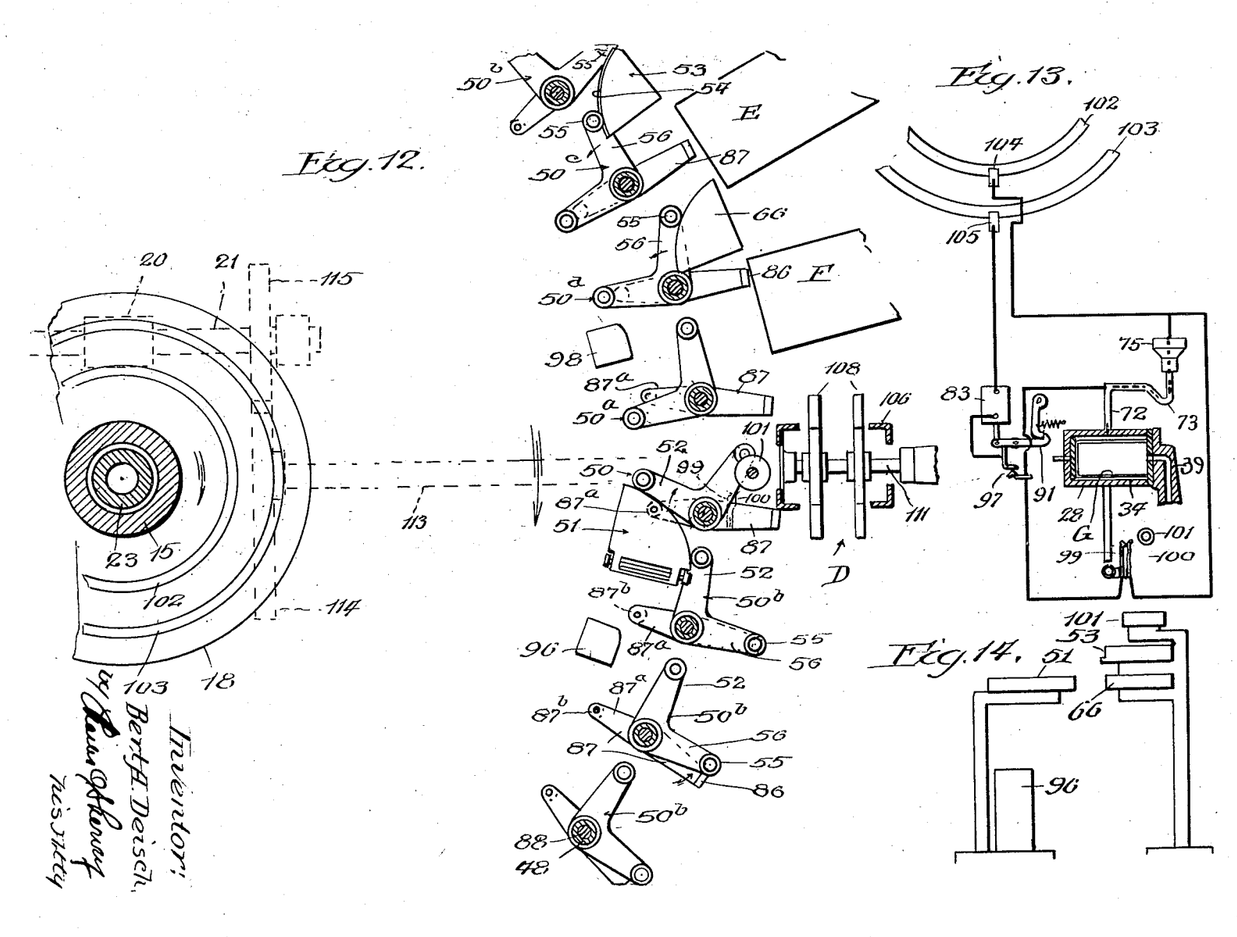
Fig. 12 is a diagrammatic view in plan, illustrating the action of the mechanism which closes and opens the chambers of the can testers and co-operates with other mechanism in discharging the leaky cans at one place and the whole ones at another.
Fig. 13 is a diagrammatic view illustrating the electric circuit for one of the can testers of the machine.
Fig. 14 is a diagrammatic view in front elevation illustrating the location of the several cams which are employed in connection with the selecting mechanism.

In the diagrammatic view illustrated in Fig. 12, the inserting cam block for actuating the can inserting and ejecting levers 50 in the direction to insert the cans and close the cylinders, is seen at 51, and is located at a position slightly beyond the receiving point of the machine, whereby a can which has been brought into receiving position in the feed chute D may be inserted into a cylinder as it leaves the feed chute. The cam block 51 is mounted upon the base of the machine in position to engage with the arms 52 of the levers 50 and move them from the position of the lever shown at 50$^a$, in Fig. 12, to that shown at 50$^b$, in said figure. The movement of the lever from the first mentioned position to the second mentioned one serves to partially rotate the hollow shaft 48 and gear wheel 47 sufficiently to move the can inserter from the position seen in dotted lines in Figs. 6 and 9, to that shown in full lines in said figures. That is to say, the can inserter is moved from a position occupied where the cans are free to be inserted into the cylinder to one in which they are wholly contained within the cylinder and hermetically sealed therein.

Each can inserter is held in its closed position until the can tester associated with it approaches the discharge point for leaky cans, during which time compressed air has been supplied to the interior of the can and the same has been tested for leaks. Adjacent the discharge chute E for leaky cans is an ejecting cam block 53 for retracting the can inserter and ejecting the can contained in the cylinder of the associated can tester.

The ejecting cam block 53 has a cam face 54 which is arranged to engage with a roller 55 carried by the arm 56 of each lever 50. Said cam block 53 is arranged to move the lever 50 from the position shown at 50$^b$ in Fig. 12, to that shown at 50$^d$. The movement of the lever 50 from the position shown at 50$^b$ to 50$^d$ causes movement of the can inserter from the position seen in full lines in Figs. 6, 7 and 9, to the position shown in dotted lines in said figures, and, at the same time, causes the can ejector to be moved forward, thereby discharging the can from the cylinder 28 into the chute E for the leaky cans.

Between the ejecting cam 53 and the receiving point of the machine is a can ejecting cam block 66 which has a cam face arranged to engage with the roller 55 of the arm 56 of each lever 50 and move said lever from the position seen at 50$^b$ to that seen at 50$^d$, thereby retracting the associated can inserter and moving the can ejector forward to eject the can from the cylinder. The cam block 66 is located in the normal path of travel of the rollers 55 of the levers 50, and the cam block 53 is located in a plane either above or below the plane in which the cam block 56 is located, it being shown in the drawings as being located in a plane above that of the cam block 66.

Means are provided for lifting the rollers 55 to the plane occupied by the cam block 53, which means are under the control of the selecting mechanism, whereby in case there is a leak in a can, the selecting mechanism is actuated, and, as a result, the roller 55 is raised into the plane of the cam block 53, so that as a raised roller encounters the cam block 53, the can ejecting mechanism is actuated at the discharge chute E for leaky cans and the leaky can discharged therein. When a whole can is being tested, the selecting mechanism is not affected, and consequently, the roller 55 continues to move in the plane of the cam block 66 and is engaged thereby at the discharge chute F for the whole cans, whereby the whole cans are discharged at a place separate from the place of discharge of the leaky cans.

Compressed air is admitted to the air chambers of the cylinders 28 only when a can has been inserted thereinto and clamped therein. The purpose of this is to prevent operation of the can selecting mechanism except when a can is in the cylinder of a can tester. The means for controlling the passage of compressed air to the cylinders comprise a valve 67, interposed in the pipe line 41 and 42, and here shown as supported on the rod 62 by a bracket 68. In the block 60 is adjustably secured a valve actuating member 69, here shown in the form of a bolt, which valve actuating member is arranged to engage with the valve stem 70 of the valve 67 to thereby open the valve whenever the block 60 is moved back against the collar 65 by the can ejector.

Inasmuch as the block 60 is held in frictional engagement with the stationary rod 62, the can ejector will remain at the end of its forward stroke (after having moved to such position) unless a can is interposed between the can ejector and can inserter. Consequently, when the can inserter is moved to its closed position without a can being interposed between it and the can ejector, the ejector will not be moved back and the block 60 will remain at its forward position, and will not engage the valve stem 70 and open the valve 67. Consequently no air will be admitted to the chamber of the cylinder 28 unless a can is contained therein.

The selecting mechanism includes, among other things, an electrically operated control member, and in the electric circuit for said member is a break or gap which is normally open, but arranged to be closed by a body of mercury which is acted upon by an increase in pressure on one side thereof, whereby the mercury is shifted so as to make contact between the two terminals of the electric circuit. This feature is an important one and will now be described.

Referring to Figs. 6, 7, 9 and 10, a valve case 71 will be seen above the cylinder 28. Leading from the air chamber 29 and through said valve case 71 is a compressed air duct designated by the characters 72 and 72ª. From the valve case 71 the air duct leads through a substantially U-shaped mercury tube 73, formed of glass or other non-conducting material, and to the upper end 74 of said U-tube is secured an overflow cup 75 in which is contained an overflow chamber preferably closed at the top by a cap 76 and in open communication with the outer atmosphere through ports 77. A stuffing box 78 is provided between the cup 75 and upright member 74 of the mercury tube 73. The overflow chamber is formed with an inverted concave bottom, whereby in case any mercury enters the overflow chamber it will be drained back into the mercury tube.

The bend of the mercury tube forms a well in which is contained a body of mercury 79 which is adapted to make contact between the terminals 80 and 81 of the electric circuit which controls certain members of the can selecting mechanism. By reference to Fig. 10, it will be seen that the lower end of the terminal 80 is submerged in the mercury, whereas the lower end of the terminal 81 is located slightly above the level of the mercury and out of contact therewith. It will be evident that so long as the pressure on both ends of the mercury is equal, the mercury will stand at a given level in the two branches of the U-tube. Also that in case the pressure in the branch 82 of the mercury tube exceeds that in the branch 74, the level of the mercury will be raised in the branch 74, thereby closing the circuit between the terminals 80 and 81.

As has been stated, the internal diameter of the cylinder 28 is slightly greater than the external diameter of the cans which are being tested by the machine. Consequently, a very restricted air space is afforded between the external wall of the can and the internal wall of the cylinder, whereas a comparatively large air space is afforded in the interior of the can. It will be understood, therefore, that when compressed air is admitted to the interior of the can, the open end of which is sealed, and which is contained in a chamber which is sealed against the outer air, that in case of a minute or a large leak in the can, the compressed air will readily find its way into the restricted air space surrounding the can, thereby building up a pressure therein very rapidly, and there being an air duct leading from the restricted space to the mercury tube, compressed air readily finds its way to the body of mercury and destroys the equilibrium of the mercury, causing the end contained in the branch 74 to rise and make contact with the terminal 81, thereby closing the circuit to a solenoid 83, which in turn releases an arm 89 and causes the roller 55 to be raised into the plane of the can ejecting cam block 53 for leaky cans.

The electric element of the can selector is here shown to comprise a solenoid 83 supported upon the cylinder 28 and is included in the circuit controlled by the mercury or mercury switch above described. The solenoid when energized is arranged to release certain mechanism permitting it to shift the position of the roller 55 to engage with the can ejecting cam block for leaky cans. In the form of the invention illustrated, the roller 55 is mounted upon a stem 84 guided in a boss formed in the arm 56 of each lever 50, the lower end of the stem being provided with a head 85 adapted for engagement with the cam face of a cam block 86 located upon a lever 87 which is secured upon the lower end of a rock shaft 88, preferably arranged co-axial with and extending through the hollow shaft 48.

Figures 6, 7, 8:
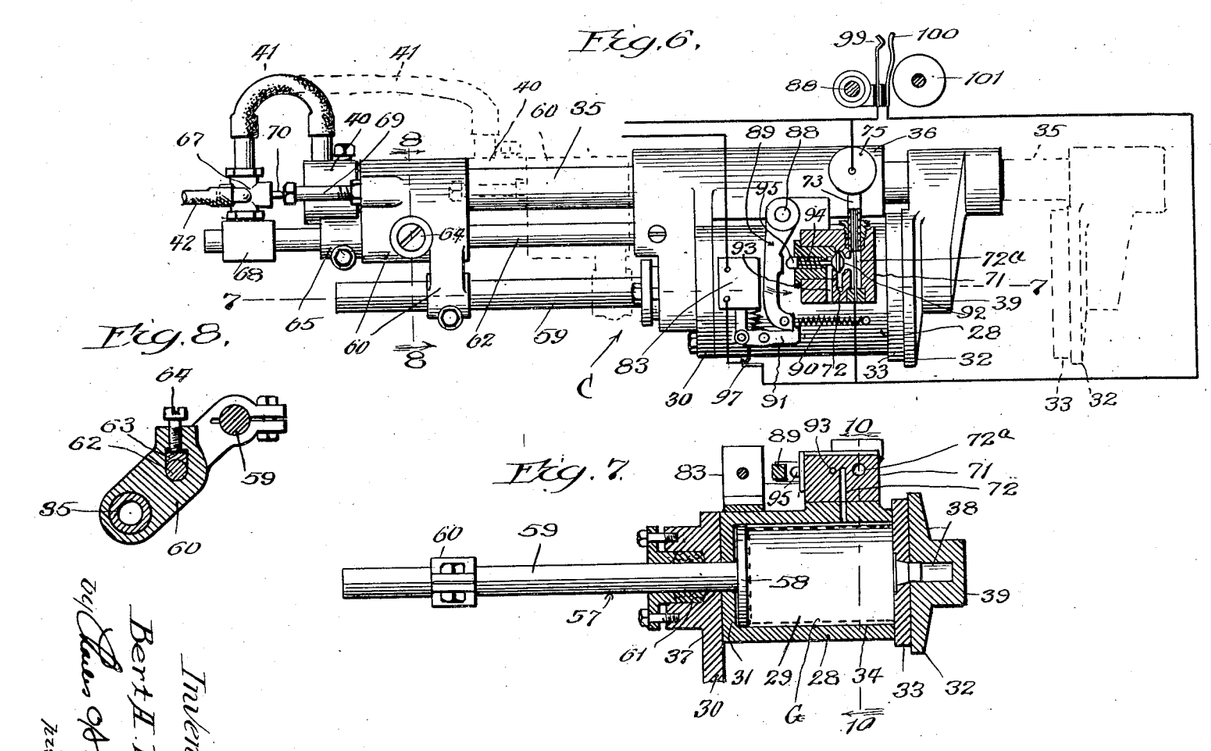
Fig. 6 is a plan of the can tester seen in Fig. 4 with certain parts broken out to show parts that would otherwise be hidden from view.
Fig. 7 is a detail longitudinal section taken on the line 7—7 of Fig. 6.
Fig. 8 is a detail vertical cross section taken on the line 8—8 of Fig. 6.
Figures 9, 10, 11:
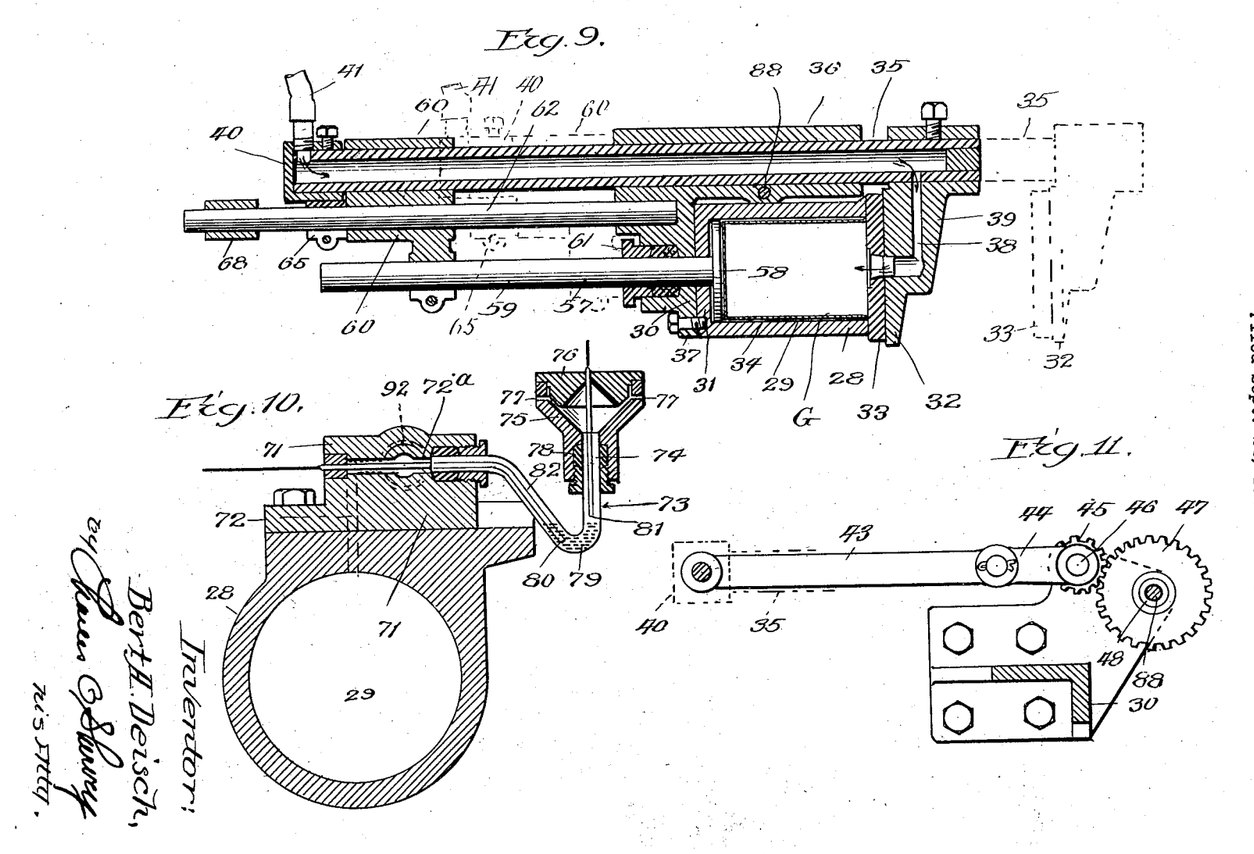
Fig. 9 is a detail longitudinal section taken on the line 9—9 of Fig. 5.
Fig. 10 is a detail vertical cross section taken on the line 10—10 of Fig. 7.
Fig. 11 is a detail horizontal section taken on the line 11—11 of Fig. 4.

Upon the upper end of the rock shaft 88 is an arm 89 spring actuated in one direction by a spring 90 and held against the action of said spring by a spring actuated latch member 91 associated with and operated by the solenoid 83 (see Fig. 6). The spring 90 acts to swing the arm 89 in the direction of the arrow thereon in Fig. 6, thereby swinging the lever 87 in the direction of the arrow thereon in Fig. 12, and moving the cam block 86 underneath the head of the stem 84, and, consequently, raising said stem and therewith the roller 55, and bringing it into the plane of the can ejector cam block 53 for leaky cans.

When a whole can is being tested, the solenoid remains unaffected, and, consequently, the arm 89 is held back in normal position by the latch 91, and the roller 55 remains in the plane of the can ejector cam block 66 for the whole cans. In case, however, a leaky can is being tested, the mercury in the U-tube is shifted under the influence of the pressure afforded by reason of the leak, and the circuit to the solenoid is thereby closed, the latch 91 is actuated and the arm 89 moved over by the spring 90, and consequently, the shaft 88 and lever 87 are partially rotated, thereby moving the cam block 86 under the spindle 64 and the latter is thereby raised bringing the roller 55 into the plane of the can ejecting cam block 53 for leaky cans.

It has been found that when the can is inserted into the air chamber of the cylinder and becomes embedded in the face of the rubber block 33, the air in the restricted space is compressed slightly and sometimes sufficiently to shift the mercury and make the electrical connection which releases the arm 89. The release of the arm 89 causes a corresponding setting of the cam block 86 which raises the roller 55 into the plane of the can ejector cam block for the leaky cans, and under such circumstances whole cans might be discharged into the chute for leaky cans. Means has been provided for restoring the parts to normal position before the actual testing of the can takes place.

As is shown in Fig. 6, a double faced valve 92 is located in the air duct 72 and 72$^a$ and is adapted to seat on two valve seats, one of which controls a port between the two branches 72 and 72$^a$ of the compressed air duct, and the other of which controls a port between the branch 72 and air discharge duct 93 which leads to the outer atmosphere. Normally the valve 92 closes the port between the branch 72 and the air discharge duct 93 and opens the port between the branches 72 and 72$^a$, so that normally there is a continuous passage between the restricted space outside of the can and the mercury tube.

A spring 94 engaging the shouldered part of the valve stem 95 acts to yieldingly hold the valve 92 seated over the port to the air discharge duct 93. The arm 89 is arranged to engage the valve stem 95 whenever released from the latch member 91 and thereby seat the valve 92 over the port between the air duct branches 72 and 72$^a$ and open the port between the branch 72 and air discharge duct 93.

As shown, a separate electric circuit is provided for the solenoid whereby the latter may be energized to release the arm 89 and actuate the valve 92 to close the port between the branches 72 and 72$^a$ of the compressed air duct and open the port between the branch 72 and air discharge duct 93 and vent the restricted space in the testing cylinder. When the valve 92 is moved into this position, it permits the restricted space around the can to be vented without affecting the mercury in the mercury tube. The switch for controlling the separate circuit to the solenoid comprises contact points 99 and 100, here shown as mounted on the bracket 30, and arranged to encounter a cam or roller 101 located on the base B, at the proper place to engage the contact 100 and just prior to the time that the can is inserted and sealed within the chamber of the associated can tester, thereby closing the circuit to the solenoid, whereby the lever 89 is released and the valve 92 moved over to open the port to the air discharge duct.

A latch engaging cam block 96 is provided on the base of the machine and located slightly beyond the cam block 51 in the path of the arm 87$^a$ of the lever 87, or in the path of a roller 87$^b$ thereon, and said cam block 96 acts to turn the lever 87 back to normal position, thereby moving the arm 89 back into engagement with the latch member 91 and permitting the spring 94 to return the valve 92 to its normal position where it opens the passageway through the branches 72 and 72$^a$ of the compressed air duct between the restricted air space and the mercury tube. It will be observed, therefore, that when a can is being clamped in place in the cylinder the restricted space is vented to the outer atmosphere temporarily without closing the switch and the parts are returned to normal position before the compressed air is admitted to the can.

It is found advisable to open the circuit to the solenoid immediately after it has been energized, and, for this reason, a switch, indicated at 97, is provided in connection with the latch member 91, the arrangement being such that when the latch is shifted to release the arm 89, the switch 97 is opened, thereby breaking the circuit for the solenoid, and when the latch member is returned to its active position, the switch 97 is closed.

It will be understood that in case there is no leak in a can contained in a given cylinder 28, the electric mechanism described remains ineffective, and, consequently, the roller 55 of the lever 50 associated with said mechanism remains in the plane of the can ejector cam for the whole cans. In the case of a leaky can, however, the solenoid and parts affected thereby are actuated and it then becomes necessary to lower the roller 55 after the leaky can has been discharged and before the can tester, in which the can was contained, arrives at the receiving point of the machine. A cam block 98, similar to the cam block 96, is provided on the base of the machine in position between the discharge place for leaky cans and the receiving place which acts on the cam lever 87 in the same manner as does the cam block 96.

The electric circuits for the solenoid are best shown in Fig. 13. The conductor wires from the source of electricity lead to a pair of concentric rings 102 and 103 secured upon the base of the machine, and associated with each can tester are contact pieces 104 and 105 that track upon the rings 102 and 103. The contact pieces 104 and 105 may be secured to the turntable in any suitable manner, and the wires lead from said contact pieces 104 and 105 to the electric element of each can selecting mechanism. As shown in Fig. 13, the circuit, which is controlled by the mercury switch, leads from the ring 102 through the mercury tube thence through the switch 97 through the solenoid 83 and back to the ring 103. The circuit which is operated by the contact points 99 and 100 leads from the ring 102 through the contact points 99 and 100, through the switch 97 and solenoid 83 and back to the ring 103.

Figures 1, 2:
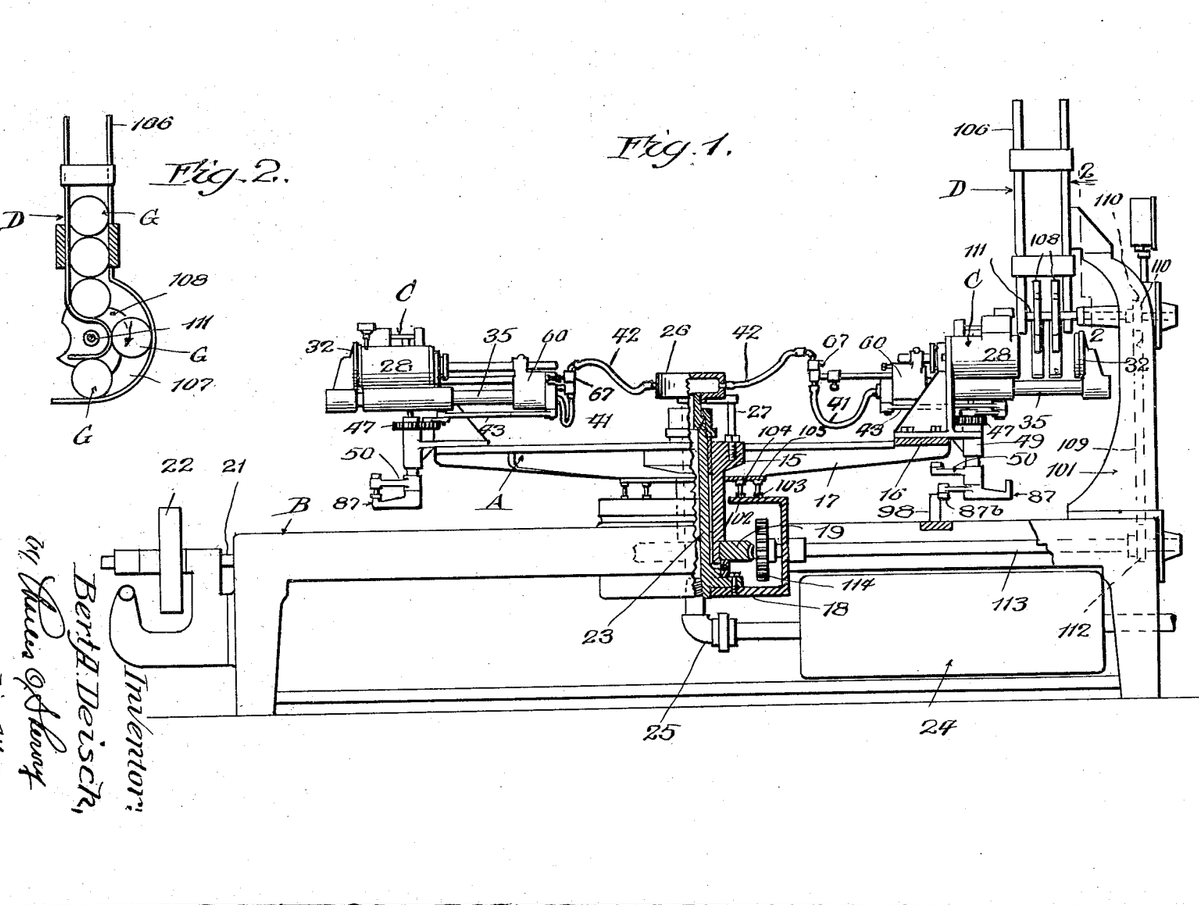
Figure 1 is a view partly in side elevation and partly in vertical longitudinal section of a can testing machine embodying a simple form of the present invention, and showing two of the can testers, the remainder having been removed from the drawing for the purpose of clarity.
Fig. 2 is an end elevation of a feed chute, with its support cut away on the line 2—2 of Fig. 1.
Figure 3:
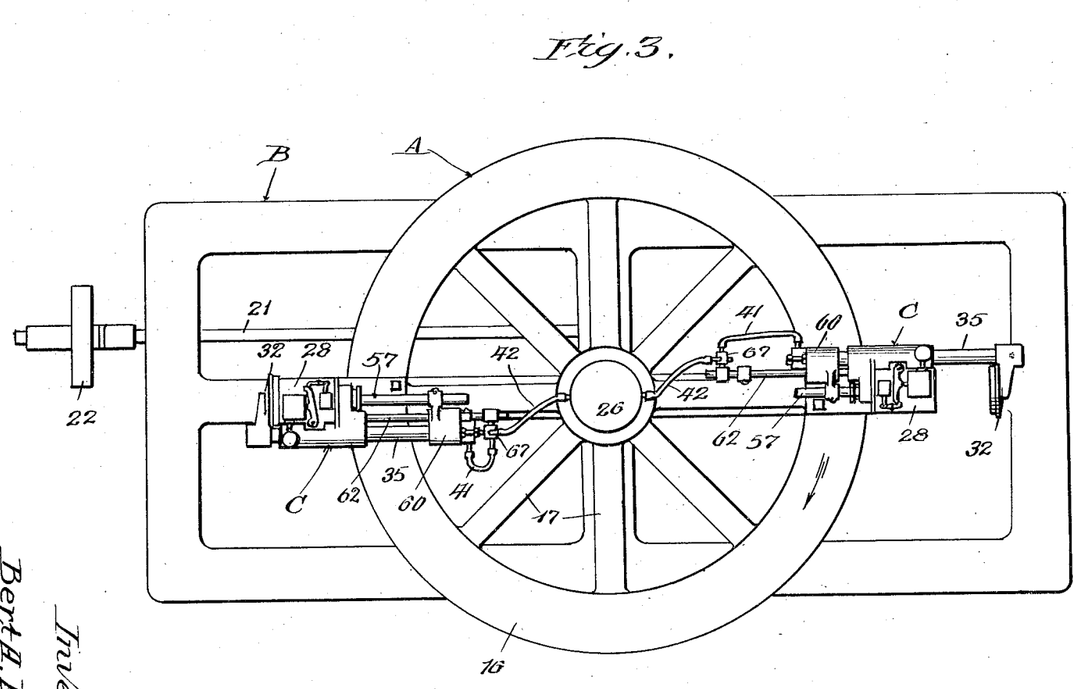
Fig. 3 is a plan of the parts seen in Fig. 1, with the feed chute omitted.
Figure 4:
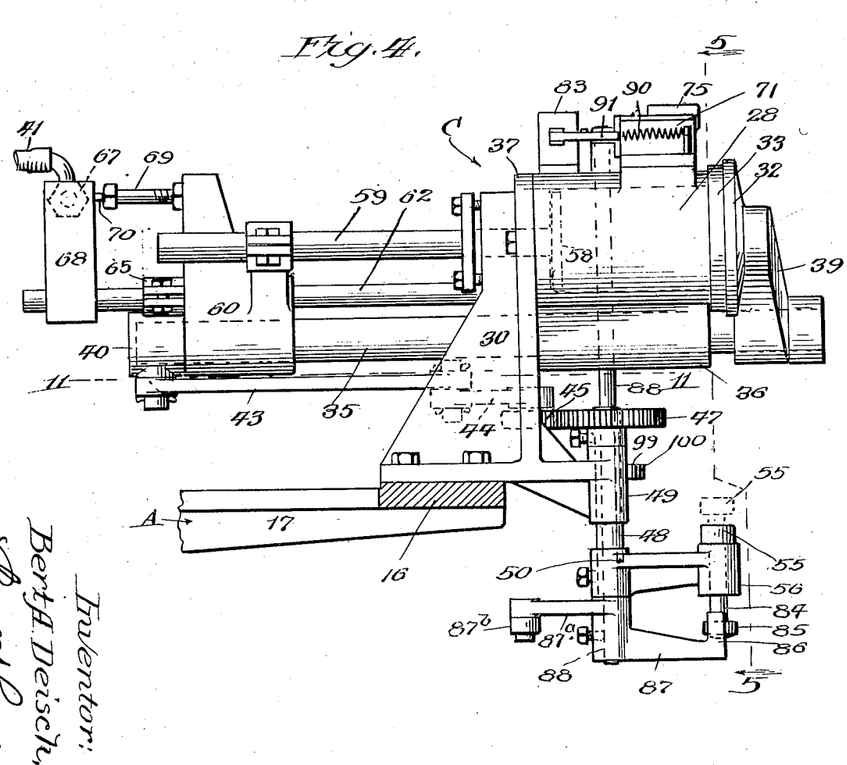
Fig. 4 is a detail side elevation of one of the can testers, showing a fragment of the carrier in vertical section.
Figure 5:
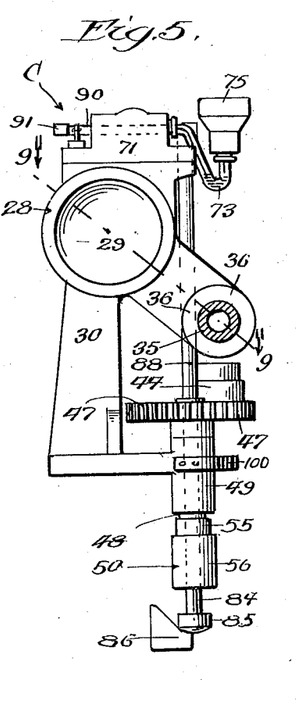
Fig. 5 is a detail vertical cross section taken on the line 5—5 of Fig. 4.

While no particular form of feed mechanism for the cans is required, the one illustrated has been shown for the sake of convenience. Referring to Figs. 1 and 2, a vertical chute 106 is provided, which terminates in a semi-circular open ended part 107. Concentric with the semi-circular part are star wheels 108 which engage with the cans and feed them into co-axial alignment with the cylinders of the can testers as they pass the open end of the feed chute, at which time the cans are picked up by the can inserter, pressed against the can ejecter and inserted into the cylinder. The star wheels 108 are driven by suitable gearing, here shown as comprising a sprocket chain 109 trained over a sprocket 110 mounted on the star wheel shaft 111 and trained over a sprocket wheel 112 mounted on a shaft 113 which is geared to the main drive shaft by gear wheels 114 and 115 (see Fig. 12).

In the operation of the machine, the cans are fed to the can testers at the receiving point of the machine where they are picked up one at a time by the can inserters and inserted into the cylinder of the can tester which at that time is passing the feed chute. As the can engages the head of the can ejector, the stem 59 and block 60 are moved backwards by the can inserter until the block 60 strikes against the collar 65 on the stationary rod 62 which limits the backward movement of the can and the final closing movement of the inserter presses the rubber block tightly upon the ends of the cylinder and can contained in the chamber thereof. It is understood that the cam block 51 engages the lever 50 associated with the cam tester and moves the can inserter through the instrumentality of the hollow shaft 48, gear wheel 47, pinion 45, arm 44 and link 43. As the rubber block finally closes the open end of the cylinder, the valve actuating member 69 engages the stem 70 of the valve 67, thereby admitting compressed air through the hollow rod 35 and conduit 38 into the interior of the can. However, just prior to the admission of the compressed air into the can, the restricted space surrounding the can has been vented and the valve 92 and arm 89 restored to normal position. In case the can is whole, the selecting mechanism and electric control means therefor are not effective, and, consequently, the roller 55 of the lever 50 continues to move in the plane of the can ejecting cam block 66 for the whole cans and the can is finally discharged through the chute F when the lever 50 engages with the can ejecting cam block 66.

If, however, a leak is present in the can which is being tested, compressed air finds its way into the restricted air space surrounding the can regardless of how minute the leak might be and raises the pressure in said restricted air space, and, consequently, the pressure is raised in the compressed air ducts 72 and 72ª and the mercury tube 74, the result being that one end of the body of mercury is depressed and the other raised, thereby making an electrical contact between the terminals 80 and 81 of the circuit and closing the circuit to the solenoid 83. The solenoid being energized, the arm 89 is released from the latch member 91 and drawn over by the spring 90, thereby shifting the valve 92 so as to close the air duct between the restricted space around the can and the mercury tube, and, at the same time, venting said restricted space. In this manner, in case there is an abnormally large leak in the can there is no danger of the compressed air forcing the mercury out of the mercury tube and overflow cup. At the same time, the switch 97 is opened and consequently the circuit to the solenoid is broken.

The movement of the lever 89 causes the lever 87 and the cam block 86 thereon to be moved under the stem 84 of the roller 55 whereupon said roller is raised bringing it into the plane of the can ejecting cam block 53 for leaky cans, whereby when said roller reaches the last mentioned cam it is engaged thereby and the lever 50 is swung back, thereby actuating the can inserter through the associated mechanism, at the discharge chute E for leaky cans and as the can inserter is moved back it carries with it the block 60 which in turn moves the can ejector forward and discharges the can from the cylinder of the can tester into the discharge chute E.

As the can tester continues its onward movement, the arm 87ª of the lever 87 engages the cam block 98 and the cam block 86 is thereupon moved from underneath the stem, and the roller 55 falls to its normal position in the plane of the can ejecting cam block for whole cans. After a whole or a leaky can has been ejected, and the can tester again approaches the receiving point of the machine, the vent is opened in the compressed air duct between the chamber of the cylinder and the mercury tube and the can tester comes into position for receiving and testing another can.

While the invention has been shown and described in connection with a supply of compressed air as the medium for acting on the mercury of the mercury switch, it is to be understood that either plus pressure or minus pressure (vacuum) may be employed with the same results, and while certain mechanical elements have been described in detail for causing the leaky cans to be discharged at a different place than the whole cans, various other equivalent mechanism may be substituted therefor.

Furthermore, an electric switch or contact making device, using mercury or a mobile electric conductor, has been described in detail. Other fluid or mobile electric conductors may be substituted for mercury, and I do not, therefore, wish to limit the invention to mercury as the mobile electric conductor of the switch, and desire it to be understood that any equivalent electric conductor capable of movement under the influence of pneumatic pressure is included in the term "mercury". The term "mercury switch" or "electric switch", as herein used in connection with the electric circuit to the solenoid, is to be understood as including any electric contact making device employing a mobile element capable of closing an electric circuit. Furthermore, that the term "solenoid", as used in this specification and claims, includes all equivalent electric or magnetic apparatus capable when energized of producing motion of an actuating member.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. In a can testing machine, the combination of a can testing cylinder having an air chamber adapted to receive a can therein, means for closing and sealing the chamber and can from the outer atmosphere, there being a restricted air space on one side of the can and a relatively large air space on the other side thereof separated from the restricted air space by the wall of the can, means for changing the pressure in said relatively large air space whereby a change in the air pressure of said restricted space caused by the leakage in a can is utilized to eject an imperfect can, electrically controlled can selecting mechanism including an electric circuit for the electric control element thereof, a pressure operated electric switch in said circuit having a shiftable liquid body exposed to atmospheric pressure on one side, and an air duct leading from said liquid body to the restricted air space at the can.

2. In a can testing machine, the combination of a can testing cylinder having an air chamber adapted to receive a can therein, means for closing and sealing the air chamber and the can from the outer atmosphere, there being a restricted air space between the wall of the can and the surrounding wall of the air chamber, and a relatively large space within the can, said spaces being separated by the wall of the can, means for changing the pressure in the interior of the can whereby a change in the pressure in said restricted space caused by a leak in the can is utilized to eject an imperfect can, electrically controlled can selecting mechanism including an electric circuit for the electric control element thereof, a pressure operated electric switch in said circuit having a shiftable liquid body exposed to atmospheric pressure on one side, and an air duct leading from said liquid body to the restricted air space around the can.

3. In a can testing machine, the combination of a can testing cylinder having an air chamber adapted to receive a can therein, means for closing and sealing the chamber and the can from the outer atmosphere, there being a restricted air space on one side of the can and a relatively large air space on the other side thereof separated from the restricted air space by the wall of the can, means for supplying compressed air to said relatively large air space at the can, whereby a change in the pressure in the restricted space caused by a leak in the can is utilized to eject an imperfect can, electrically controlled can selecting mechanism including an electric circuit for the electric control element thereof, a pressure operated mercury switch in said circuit having a shiftable body of mercury exposed to atmospheric pressure on one side, and an air duct leading from said body of mercury to said restricted air space at the can.

4. In a can testing machine, the combination of a can testing cylinder having an air chamber adapted to receive a can therein, means for closing and sealing the chamber and the can from the outer atmosphere, there being a restricted air space between the wall of the can and the surrounding wall of the air chamber and a relatively large air space in the interior of the can, said spaces being separated by the wall of the can, means for supplying compressed air to the interior of the can, whereby a change in the pressure in said restricted space caused by a leak in the can is utilized to eject an imperfect can, electrically controlled can selecting mechanism including an electric circuit for the electric control element thereof, a pressure operated mercury switch in said circuit having a shiftable body of mercury exposed to atmospheric pressure on one side, and an air duct leading from said body of mercury to said restricted air space at the can.

5. In a can testing machine, the combination of a can testing cylinder having an air chamber adapted to receive a can therein, means for closing and sealing the air chamber and the can from the outer atmosphere, there being a restricted air space on one side of the can and a relatively large air space on the other side of the can separated from the restricted air space by the wall of the can, means for changing the pressure in said relatively large air space, whereby a change in the pressure in said restricted space caused by a leak in the can is utilized to eject an imperfect can, can selecting mechanism including an electrically operated control element and a circuit therefor having a normally open break therein, a mercury tube containing a shiftable body of mercury adapted to make and break contact of said open break in the circuit, said body of mercury being exposed to atmospheric pressure on one side, and an air duct leading from said mercury tube to the restricted air space at the can.

6. In a can testing machine, the combination of a can testing cylinder having an air chamber adapted to receive a can therein, means for closing and sealing the chamber and the can from the outer atmosphere, there being a restricted air space between the wall of the can and the surrounding wall of the air chamber, and there being a relatively large air space within the can, said spaces being separated by the wall of the can, means for changing the pressure in said relatively large air space whereby a change in the pressure in said restricted space caused by a leak in the can is utilized to eject an imperfect can, a mercury tube containing a shiftable body of mercury open to atmospheric pressure on one side and having an air duct leading from the body of mercury to said restricted air space around the can, the mercury in said mercury tube being acted upon by changes of pressure in said restricted air space, and can selecting mechanism including an electric control element contained in an electric circuit in which the circuit is made and broken by said body of mercury.

7. In a can testing machine, the combination of a can testing cylinder having an air chamber adapted to receive a can therein, means for closing and sealing the chamber and the can from the outer atmosphere, there being a restricted air space between the wall of the can and the surrounding wall of the air chamber and there being a relatively large air space within the can, said spaces being separated by the wall of the can, a mercury tube containing a body of mercury and having an air duct leading to said restricted air space around the can, and an overflow chamber for the mercury, and can selecting mechanism including an electric control element having an electric circuit in which the circuit is made and broken by said body of mercury.

8. In a can testing machine, the combination of a can testing cylinder having an air chamber adapted to receive a can therein, means for closing and sealing the chamber and the can from the outer atmosphere, there being a restricted air space between the wall of the can and the surrounding wall of the air chamber, and there being a relatively large air space within the can, said spaces being separated by the wall of the can, a mercury tube containing a body of mercury and having an air duct leading to said restricted air space around the can, there being a valve controlled by-pass leading from said air duct to the outer atmosphere, means for actuating said valve to close the air duct to the mercury tube and open the same to the outer atmosphere, and can selecting mechanism including an electric control element having an electric circuit in which the circuit is made and broken by said body of mercury.

9. In a can testing machine, the combination of a can testing cylinder having an air chamber adapted to receive a can therein, a can inserter adapted to insert a can into said cylinder and seal the chamber and a can from the outer atmosphere, there being a restricted air space between the wall of the can and the surrounding wall of the air chamber, and a relatively large air space within the can, said spaces being separated by the wall of the can, a can ejector moving in said air chamber and connected to and moving with said can inserter, mechanism for reciprocating said can inserter and therewith the can ejector, means for supplying compressed air to the interior of the can, and electrically controlled can selecting mechanism having an electric circuit controlled by a mercury switch having an air duct leading from said restricted space around the can.

10. In a can testing machine, the combination of a can testing cylinder having an air chamber adapted to receive a can therein, a can inserter adapted to insert a can into the chamber and seal the chamber and the can from the outer atmosphere, actuating means for the can inserter, there being a restricted air space between the wall of the can and internal wall of the air chamber and a relatively large air space within the can, a source of compressed air supply and an air conduit leading therefrom to the interior of the can, there being a control valve in said conduit, and means associated with said can inserter for opening said valve when the can is inserted into the air chamber.

11. In a can testing machine, the combination of a can testing cylinder having an air chamber adapted to receive a can therein, a can inserter adapted to insert a can into the chamber and seal the chamber and the can from the outer atmosphere, a can ejector having a head within said chamber against which a can is clamped by the can inserter, actuating means for the can inserter and can ejector, there being a restricted air space between the wall of the can and internal wall of the air chamber and a relatively large air space within the can, a source of compressed air supply and an air conduit leading therefrom to the interior of the can, there being a control valve in said conduit, and means associated with said can ejector for opening said valve when the can is inserted into the air chamber.

12. In a can testing machine, the combination of a can testing cylinder having an air chamber adapted to receive a can therein, a can inserter adapted to insert a can into the chamber and seal the chamber and the can from the outer atmosphere, a can ejector having a head within said chamber against which the can is clamped by the can inserter, actuating means for the can inserter and can ejector, there being a lost motion connection between the can inserter and can ejector, and there being a restricted air space between the wall of the can and internal wall of the air chamber and a relatively large air space within the can, a source of compressed air supply and an air conduit leading therefrom to the interior of the can, there being a control valve in said conduit, and means associated with said can ejector for opening said valve when the can is inserted into the air chamber.

13. In a can testing machine, the combination of a can testing cylinder having an air chamber adapted to receive a can therein, means for closing the chamber and the can from the outer atmosphere, there being a restricted air space between the wall of the can and the internal wall of the air chamber, said spaces being separated by the wall of the can, means for supplying compressed air to the interior of said can, and a circuit closing mercury switch including a mercury tube and a shiftable body of mercury therein exposed on one side to atmospheric pressure, there being an air duct leading from said mercury tube to the restricted space around the can.

14. In a can testing machine, the combination of a can testing cylinder having an air chamber adapted to receive a can therein, means for closing the chamber and the can from the outer atmosphere, there being a restricted air space between the wall of the can and the internal wall of the air chamber, said spaces being separated by the wall of the can, a circuit closing mercury switch including a mercury tube and a body of mercury therein, and having an air duct leading to the restricted space around the can, and there being a by-pass leading from said air duct to the outer atmosphere, a valve for controlling said air duct and by-pass, and means for actuating said valve.

15. In a can testing machine, the combination of a can testing cylinder having an air chamber adapted to receive a can therein, means for sealing the chamber and the can from the outer atmosphere, there being a restricted air space between the wall of the can and the internal wall of the air chamber, said spaces being separated by the wall of the can, a circuit closing mercury switch including a mercury tube and a body of mercury therein, and having an air duct leading to the restricted space around the can, there being a by-pass leading from said air conduit to the outer atmosphere, a valve for controlling said air duct and by-pass, and electrically operated mechanism for controlling said valve.

16. In a can testing machine, the combination of a carrier, a plurality of can testing cylinders each having an air chamber adapted to receive a can therein, means for sealing the chamber and the can from the outer atmosphere, there being a restricted air space between the wall of the can and the internal wall of the air chamber, said spaces being separated by the wall of the can, a circuit closing mercury switch including a mercury tube and a body of mercury therein, and having an air duct leading to the restricted space around the can, electrically controlled can inserting and ejecting mechanism including a lever therefor, the electric element of which can inserting and ejecting mechanism is controlled by said mercury switch, a can inserting cam, a can ejecting cam for leaky cans and a can ejecting cam for whole cans, said cams and co-operating with said lever to insert and eject the cans.

17. In a can testing machine, the combination of can cylinders each having an air chamber adapted to receive a can therein, means for closing and sealing the chamber and the can from the outer atmosphere, there being a restricted air space between the can and the surrounding wall of the air chamber, and there being a relatively large air space within the can, a circuit closing mercury switch having an air duct leading to the restricted space around the can, can inserting and can ejecting mechanism including a lever and two can ejecting cams located in two planes, said lever having a roller adapted to selectively occupy two planes co-incident with said can ejecting cams, an electric actuating element, the circuit of which is controlled by said mercury switch, and means co-operating with said electric actuating element to shift the position of said roller of the lever.

18. In a can testing machine, the combination of a rotating carrier, a plurality of can testing compressed air cylinders circumferentially arranged thereon, can inserters and can ejectors associated with said cylinders, a can inserting cam block, a leaky can ejector cam block and a whole can ejector cam block, selective means associated with said can inserters and can ejectors for each cylinder, and co-operating with said cams, and electrically operated mechanism associated with said selective means for actuating said selective means, said electrically operated mechanism including a mercury switch having an air duct leading to the associated cylinder.

19. In a can testing machine, the combination of a rotating carrier, a plurality of can testing compressed air cylinders circumferentially arranged thereon, can inserters and can ejectors associated with said cylinders, a can inserting cam block, a leaky can ejector cam block and a whole can ejector cam block, selective means associated with the can inserters and can ejectors for each cylinder and each including a lever capable of engagement with all of said cams, electrically operated mechanism associated with said selective means for actuating said selective means, said electrically operated mechanism including a mercury switch having an air duct leading to the associated cylinder.

BERT A. DEISCH.